United States Patent
Petersen

(10) Patent No.: US 12,214,680 B2
(45) Date of Patent: Feb. 4, 2025

(54) METHOD FOR ARRANGING INDUCTIVE CHARGERS IN A WAREHOUSE, SYSTEM HAVING AN ARRANGEMENT OF INDUCTIVE CHARGERS, AND AN INDUSTRIAL TRUCK FOR A WAREHOUSE

(71) Applicant: Jungheinrich Aktiengesellschaft, Hamburg (DE)

(72) Inventor: Marinus Petersen, Neumünster (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 17/168,724

(22) Filed: Feb. 5, 2021

(65) Prior Publication Data
US 2021/0245609 A1    Aug. 12, 2021

(30) Foreign Application Priority Data
Feb. 6, 2020    (DE) .................... 10 2020 103 109.2

(51) Int. Cl.
| | | |
|---|---|---|
| *B60L 53/12* | (2019.01) | |
| *H02J 7/00* | (2006.01) | |
| *H02J 7/02* | (2016.01) | |
| *H02J 50/10* | (2016.01) | |
| *H02J 50/40* | (2016.01) | |

(52) U.S. Cl.
CPC ............ *B60L 53/12* (2019.02); *H02J 7/0013* (2013.01); *H02J 7/02* (2013.01); *H02J 50/10* (2016.02); *H02J 50/40* (2016.02); *B60L 2200/36* (2013.01)

(58) Field of Classification Search
CPC ...................................................... B60L 53/12
USPC .......................................................... 320/104
See application file for complete search history.

(56) References Cited

U.S. PATENT DOCUMENTS

| | | | |
|---|---|---|---|
| 2016/0297307 A1* | 10/2016 | Hinterberger | B60L 50/51 |
| 2017/0326995 A1 | 11/2017 | Kotani et al. | |
| 2019/0375301 A1* | 12/2019 | Whitt | B60W 10/20 |
| 2020/0212721 A1* | 7/2020 | Narayana Bhat | H02J 50/402 |

FOREIGN PATENT DOCUMENTS

| | | |
|---|---|---|
| DE | 102010005591 A1 | 7/2011 |
| DE | 102017107310 A1 | 10/2018 |
| EP | 3825163 A1 | 5/2021 |

OTHER PUBLICATIONS

Teemu Raitaluoto Prerequisites of high power charging infrastructure and fully electrical machinery implementation in harbor environment; aaltodoc.aalto.fi; published Oct. 19, 2015; Retrieved from the Internet <https://aaltodoc.aalto.fi/handle/123456789/18645>; (72 pages).

* cited by examiner

*Primary Examiner* — Edward Tso
*Assistant Examiner* — Ahmed H Omar
(74) *Attorney, Agent, or Firm* — Barclay Damon LLP

(57) ABSTRACT

A method for inductively charging one or more inductively chargeable industrial trucks used in a warehouse, wherein a target value is determined for an average charging time of each of the industrial trucks used in the warehouse and distributing a plurality of inductive charger in the warehouse such that at least one of the industrial trucks can be inductively charged in accordance with at least with the target value.

14 Claims, 4 Drawing Sheets

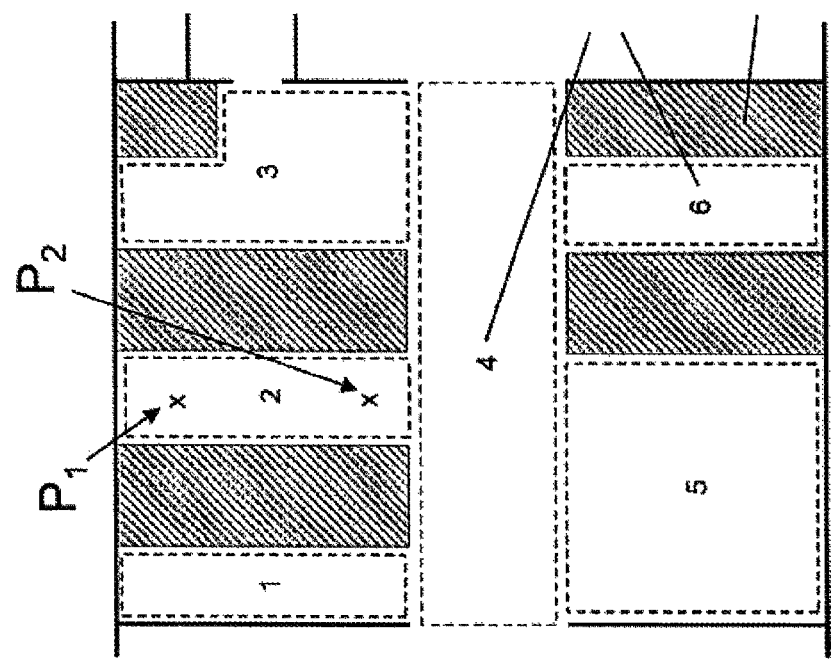

METHOD FOR ARRANGING INDUCTIVE CHARGERS IN A WAREHOUSE, SYSTEM HAVING AN ARRANGEMENT OF INDUCTIVE CHARGERS, AND AN INDUSTRIAL TRUCK FOR A WAREHOUSE

CROSS REFERENCE TO RELATED DISCLOSURE

This application is based upon and claims priority to, under relevant sections of 35 U.S.C. § 119, German Patent Application No. 10 2020 103 109.2, filed Feb. 6, 2021, the entire contents of which are hereby incorporated by reference.

The present disclosure relates to a warehouse in which inductive chargers for industrial trucks are provided. In particular, the disclosure relates to a method for arranging the inductive chargers in the warehouse and to the warehouse itself. The disclosure also relates to an industrial track having an inductively chargeable energy store.

BACKGROUND

The energy store of electrically operated industrial trucks must be recharged after the vehicle has been used. Therefore, stationary charging devices may be provided in a warehouse environment in which the industrial truck is used. After being used, the vehicle is connected to the charging device in order to recharge the partially or fully drained energy store. The use of a charging cable has proven disadvantageous in a warehouse environment on account of the space required. As an alternative to cable-based recharging of the energy store, inductive charging of the stationary industrial truck may also be provided. In inductive charging, the industrial truck is parked at or next to the inductive charging device in order to take up the electrical energy inductively, for example by means of a defined coil arrangement having a primary and secondary coil. This may also involve stationary charging of the industrial truck, but in this case it is inductive and not cable-based.

However, if the industrial truck is to be charged dynamically rather than stationarily in the warehouse, there are various technical difficulties that have to be considered during implementation. A major problem in implementation is that the travel paths of industrial trucks in warehouses are generally not subject to any spatial restrictions. As a result, unlike for example in rail-based transportation, there are no rigidly defined lanes or intersection regions that can be equipped with chargers for dynamically charging the industrial truck, i.e. charging same during operation.

The term "industrial truck" should be understood in the following in the general sense, i.e. any driven, drivable transport means in a warehouse can be interpreted as an industrial truck, and self-driving or automatically guided vehicles (AVGs) are in particular also considered to be industrial trucks. With regard to the inductive chargers, a distinction is required between inductive chargers for a stationary charging process and inductive chargers that are also suitable for a dynamic charging process. In principle, there may also be inductive charging that can be used both stationarily and dynamically.

BRIEF SUMMARY OF THE DISCLOSURE

The disclosure provides a method for distributing a system of inductive chargers in a warehouse so as to charge inductively chargeable industrial trucks within and around the warehouse.

The method includes a first step of determining a target value associated with an average charging time of a typical industrial truck employed or operated in the warehouse. The average charging time calculates a duration of time expressed, for example, in hours or as a relative quantity such as hours per shift. The average charging time specifies the average length of time for which an industrial truck used in the warehouse can be charged during typical use.

In a second step, the warehouse is configured such that the inductive chargers are distributed or arranged in the warehouse to inductively charge the industrial trucks in accordance with the target value for the average charging time. The arrangement of the inductive chargers in the warehouse substantially relates to the spatial arrangement of the inductive chargers in the warehouse. According to the disclosure, the inductive chargers are spatially distributed within the warehouse such that the industrial truck can be inductively charged at least with the target value for the average charging time when used in the warehouse. Therefore, according to the disclosure, two aspects are considered in particular when arranging the inductive chargers in a warehouse. Firstly, the target value for the average charging time and, secondly, the arrangement of the inductive chargers throughout the warehouse. Both make it possible to reliably charge the industrial trucks at least up to the target value, such that each industrial truck is not fully uncharged after use, but rather has been charged for at least for the average charging time up to and including the target value. This method has proven surprisingly advantageous in the process of generating an even load distribution for consuming/withdrawing electrical power from the power supply network. In accordance with prior art methods, at the end of a shift, all industrial trucks are routinely charged at the same time. As a result, a considerable amount of power is withdrawn from the electrical supply network during this charging period. The present method reduces spikes in the power supply network inasmuch as far less power is withdrawn during this charging period, i.e., at the end of a shift, since the industrial trucks have already been charged for at least the average charging time.

The method is also based on the provision that the inductive chargers are distributed in the warehouse, i.e., based on the number and location of the inductive chargers such that each of the industrial trucks can be inductively charged during use in the warehouse. In order to be able to reach the target value for the average charging time, the number of inductive chargers plays a crucial role in addition to the spatial arrangement of the inductive chargers in the warehouse. It should be noted at this point that, in the method according to the disclosure and the considerations on which it is based, it is always assumed that operation of the industrial trucks is dictated by purely warehouse-related aspects and that it should not be restricted or altered in order to reach the target value for the average charging time.

In addition to the number and position of the inductive chargers, the charging power is also considered. That is, the industrial truck can be inductively charged during use in the warehouse at least with a target value for an average charging time. In this regard, the term "average charging power" is important. It denotes the average amount of power consumed by an industrial truck used in the warehouse while being charged during typical use. Of course, this depends on how much power is provided per unit of time by the inductive chargers and how much charging power can be taken up per unit of time by the industrial truck.

In one embodiment of the method, the warehouse is divided into a number of regions. The regions are determined according to one or more criteria. A first criterion relates to a locally homogeneously distributed average duration of stay in an assigned regions. A second criterion relates to regions classified into functional regions of the warehouse, i.e., regions wherein the industrial truck is predominantly stationary or moving. Yet another or third criterion relates to assigning regions by dividing the warehouse into (i) loading regions, (ii) transfer regions and, (iii) connection regions. The aforementioned criteria may produce different regions in the warehouse when applied individually or collectively, i.e., in combination. If the criterion associated with the locally homogeneously distributed average duration of stay is used, this creates regions in the warehouse in which the average duration of stay for a location is homogeneously distributed. Homogeneous distribution is, for example, when variation is small or decreases with increasing area of the region. The second criterion distinguishes functional regions within the warehouse. For example, the regions may be distinguished as being those wherein the industrial trucks are predominantly stationary, or those wherein the industrial trucks are predominantly moving. The third criterion also involves functional regions to a certain extent, but not in terms of whether the industrial trucks are stationary or moving, but rather in terms of tasks and functions performed by or assigned to the industrial trucks. When assigning regions, it is possible to investigate how much the individual regions contribute to the target value being reached. Based on this, the inductive chargers can be distributed and selected for the regions until the predefined target value has been reliably reached.

In another embodiment of the method, an average power consumption is determined for at least one of the industrial trucks operated in the warehouse and a charging rate for using the vehicle in the warehouse is determined at a specified charging power of the inductive chargers with the target value for the average charging time. The average power consumption for the industrial truck may, for example, be determined by measuring one or more industrial trucks during one or more instances of being used in the warehouse. It is also possible to determine the average power consumption for a typical industrial truck computationally from tasks performed or completed in the warehouse. Once an average power consumption has been determined, a charging rate for using the industrial truck in the warehouse can be determined at a specified charging power of the chargers. In the case of all chargers having the same charging power. "at a specified charging power of the chargers" means that the charging power of an individual charger is used. If the chargers have different charging powers, this quantity is based on an average value of the different charging powers. The charging rate determined in this manner indicates the ratio of power consumption and charging power as a fraction. For example, if the industrial truck has a fully-charged battery at the start of a shift, the charging rate indicates the charge level of the battery at the end of the shift.

The charge level may also be suitable for defining the number of inductive chargers required for use in the warehouse. In other words, if the energy store has a charging capacity, and the charging rate thereof is known, the number of inductive chargers required can readily be defined.

The number of chargers may be determined by starting with a region having the highest average duration of stay. After this region, the region with a descending average duration of stay is equipped with inductive chargers next. In this way, the inductive chargers are distributed in the warehouse based on descending average durations of stay. This may be checked once an arrangement has been identified for the number of inductive chargers inasmuch as it is established by means of measurement, or simulation, i.e., whether the average target value of the charging power has been reached for the industrial truck. If this is not the case, additional inductive chargers may be required in the warehouse such that the target value has been reached.

In another embodiment, in addition to the inductive chargers, stationary chargers are also used in the warehouse. In this embodiment, a first number of industrial trucks, each having a known capacity of energy storage and a second number of inductive chargers each with a known charging capacity are specified. A third number of stationary chargers is determined such that each of the industrial trucks (charged with at least the target value) is fully charged within a predefined charging time for stationary charging with the second number of chargers. The predetermined charging time may, for example, be a shift break, such that all industrial trucks are fully charged at the end of the shift break by virtue of the interaction between inductive chargers and stationary charging devices.

In yet another embodiment, a distinction can be made between stationary and dynamic chargers. Preferably, a number of stationary chargers is determined such that a number of (dynamic) inductive chargers can be reduced while still reaching the target value for the average charging time. This reasoning is based on the premise that it may be possible to reduce the number of required inductive chargers such that the target value for the average charging time can still be reached by adding a few stationary charging devices.

The following criteria can be used to determine the number of stationary chargers required. Firstly, an occupancy of stationary chargers by industrial trucks can be taken into account. The occupancy may be an average occupancy and/or a maximum occupancy of the stationary chargers by the industrial trucks. These occupancies can again be measured or computationally determined during practical use. Another criterion for the number of stationary chargers is the total number of industrial trucks used. If the total number of industrial trucks increases, the target value can still be reached by adding a few stationary charging devices without having to change the distribution of dynamic inductive chargers.

The warehouse comprises an arrangement of inductive chargers wherein the charging time required by the industrial truck corresponds at least to the target value. The arrangement of the inductive chargers in the warehouse, therefore, makes it possible for the industrial truck used to reach its target value. The target value is the value that is reached within an average time period but that may not be reached during typical use of the industrial truck.

In another embodiment of the warehouse, a region of the warehouse includes a plurality of continuous or discontinuous inductive chargers, while a second floor region in the warehouse is absent or void of inductive chargers. Therefore only part of the warehouse is equipped with inductive chargers for reaching the target value for the charging of the industrial truck during use. Preferably, the floor region provided with inductive chargers is not a single contiguous region, but rather, is divided into a plurality of discontinuous regions wherein the inductive chargers are provided.

The industrial truck according to the disclosure is equipped with an inductively chargeable energy store that can also be charged during operation of the industrial truck by an inductive chargers installed in the warehouse. A target value for an average charging time of the industrial truck used in the warehouse is provided for the industrial truck, wherein the capacity of its energy store is such that the industrial truck can be inductively charged at least with the target value for the average charging time when used in the warehouse. Therefore, in the industrial truck according to the disclosure, the capacity of its energy store is adapted to achieve the target value for the average charging time. Preferably, the inductive chargers are spatially arranged in the warehouse such that the industrial truck can be inductively charged at least with the target value for the average charging time when used in the warehouse.

BRIEF DESCRIPTION OF THE DRAWINGS

The disclosure described above will be explained in the following in more detail using an exemplary embodiment. In the drawings:

FIG. 1 shows the method wherein an inductive charging system for industrial trucks in intralogistics including the step of assigning charging regions.

DETAILED DESCRIPTION OF THE DISCLOSURE

Figures 2A, 2B:
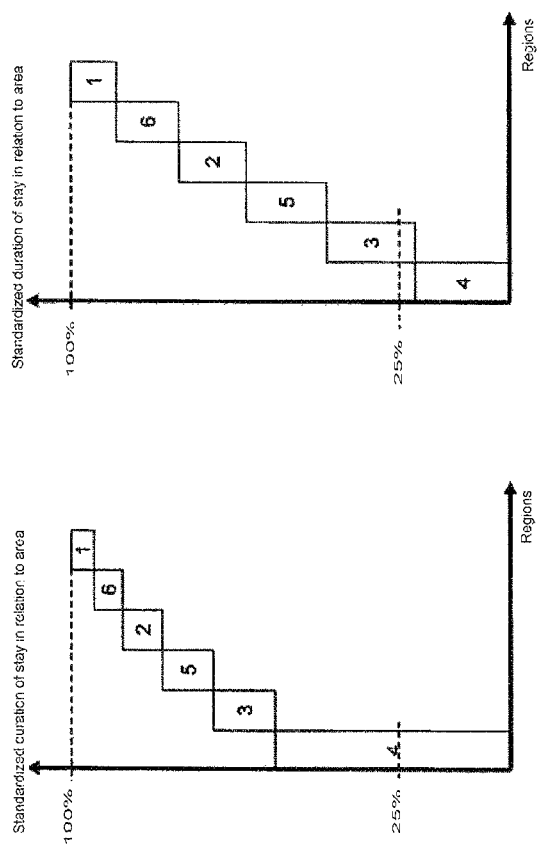
FIGS. 2a and 2b show the standardized duration of stay in relation to the area for different subdivisions of the various warehouse regions.

A method is provided for powering one or more inductively chargeable industrial trucks in a warehouse. The method includes the steps of determining a target value indicative of an average charging time associated with at least one inductively chargeable industrial truck used in the warehouse and distributing a plurality of inductive charger in the warehouse such that at least one of the industrial trucks can be inductively charged in accordance with at least the target value.

The method discloses the steps to computationally determine whether it is technically and economically feasible to employ an inductive charging system in a warehouse. In the method, it is determined, whether by computation, simulation, or measurement, how many, and which, regions of a warehouse may be equipped with inductive charging coils in order for the industrial truck to be supplied with the desired amount of energy during use in the warehouse. In so doing, a predefined target value for an average charging time may be set such that it is possible to eliminate conventional charging systems for the stationary industrial truck. Consequently, non-stop operation around the clock and without pauses is possible. It is also possible to select target values for the average charging time so as to enable additional use of stationary chargers.

FIG. 1 shows a first step, in which the warehouse is divided into six regions. In this exemplary embodiment, the number six (6) has been chosen merely by way of example, and it should be appreciated that more or fewer regions may be selected for the warehouse. Typically, a warehouse is divided into significantly more than six (6) regions. With a view to later implementation with inductive chargers, it is recommended that the regions simply be contiguous zones that can be technically separated from their neighbouring regions for the purpose of installing the inductive chargers. Region 4, for example, shows an aisle region that is separated from the shelving regions 1, 2 and 6. Subsequently, the average duration of stay in the regions is determined. Points $P_1$ and $P_2$ represent the locations where it is determined how long an industrial truck located in region 2 stays at one of these points or in its vicinity. The duration of stay should be understood to be a "probability of stay". That is, the duration of stay should always be considered an average duration of stay (in the region), given that there are no fixed time limits for the duration of stay in the region. Unlike, in the case of a road or intersection, there are no external specifications that define a stay at one of the points $P_1$ or $P_2$, but rather the average duration of stay results from a typical use of the warehouse by the industrial truck. Goods flow in and out of the warehouse and the predefined storage spaces in the warehouse. In principle, with respect to points $P_1$ and $P_2$, a higher average duration of stay can be anticipated or expected for point $P_2$ than for $P_1$, for example, because an industrial truck or AGV waits at $P_2$ before being able to turn into the region 4. In warehouse planning, (e.g., when using a warehouse management system), the aim is to achieve the most efficient and shortest possible route for warehouse management. As a result, the shelving spaces near aisle 4 are occupied first, which results in a greater probability of stay for the region P2.

In addition to the average duration of stay within the regions, it is also possible to determine to what extent the average duration of stay in the various regions 1 to 6 is locally homogeneously and distributed. This means, for example, that the duration of stay in region 4 is homogeneous over its entire area and does not differ greatly between locations. A criterion for the homogeneity may, for example, be obtained via the variation of the distribution and its scaling with the area of the number of points examined.

FIGS. 2a and 2b show the result of this evaluation. Each of the regions 1 thru 6 can be assigned a relative proportion of the average duration of stay as well as a proportion of the total available warehouse area. Therefore, region 4 has the area A4 and the average duration of stay D4, for example. All durations of stay D1 thru D6 are standardized to 100%, which means that only industrial trucks located in the warehouse are considered. The sum of all areas A1 thru A6 gives the total warehouse area. The figures clearly show that, if the target value for the average charging time is set to 25%, it is sufficient to provide only part of the region A with inductive charging coils. FIG. 2b shows an alternative distribution of regions 1 thru 6 in which the duration of stay in the region 4' is considerably shorter. In this case, for a target value of 25%, it is not only necessary for the region 4 to be equipped with inductive charging coils but also at least parts of the region 3.

Figure 3:
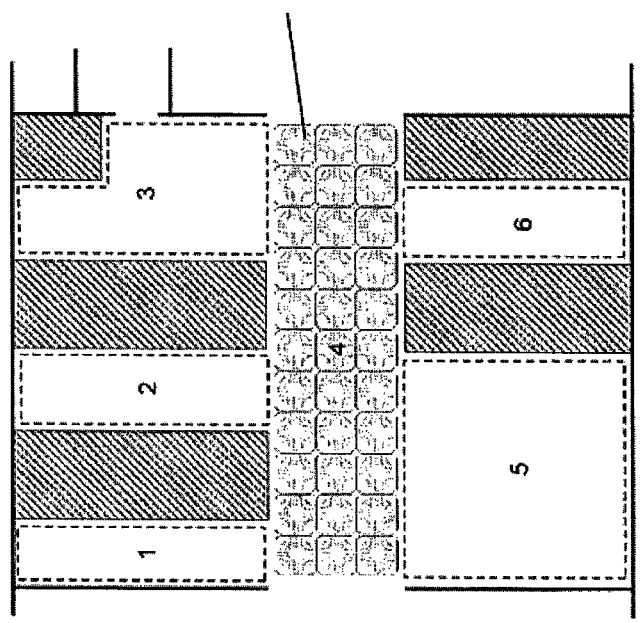
FIG. 3 shows an embodiment wherein charging coils are installed in a region of the warehouse.

FIG. 3 shows an embodiment for the regions displayed in FIG. 2a in which inductive chargers are provided in the region 4. These inductive chargers are sufficient, since they cover the region 4 substantially completely, such that the target value of 25% is significantly exceeded. However, whether or not a target value of 25% for the average charging time is actually reached depends not only on the number of inductive chargers installed in the region but also on their charging power. The charging power must be in correct proportion to the capacity of the energy store of the inductively charged industrial truck.

Figure 4:
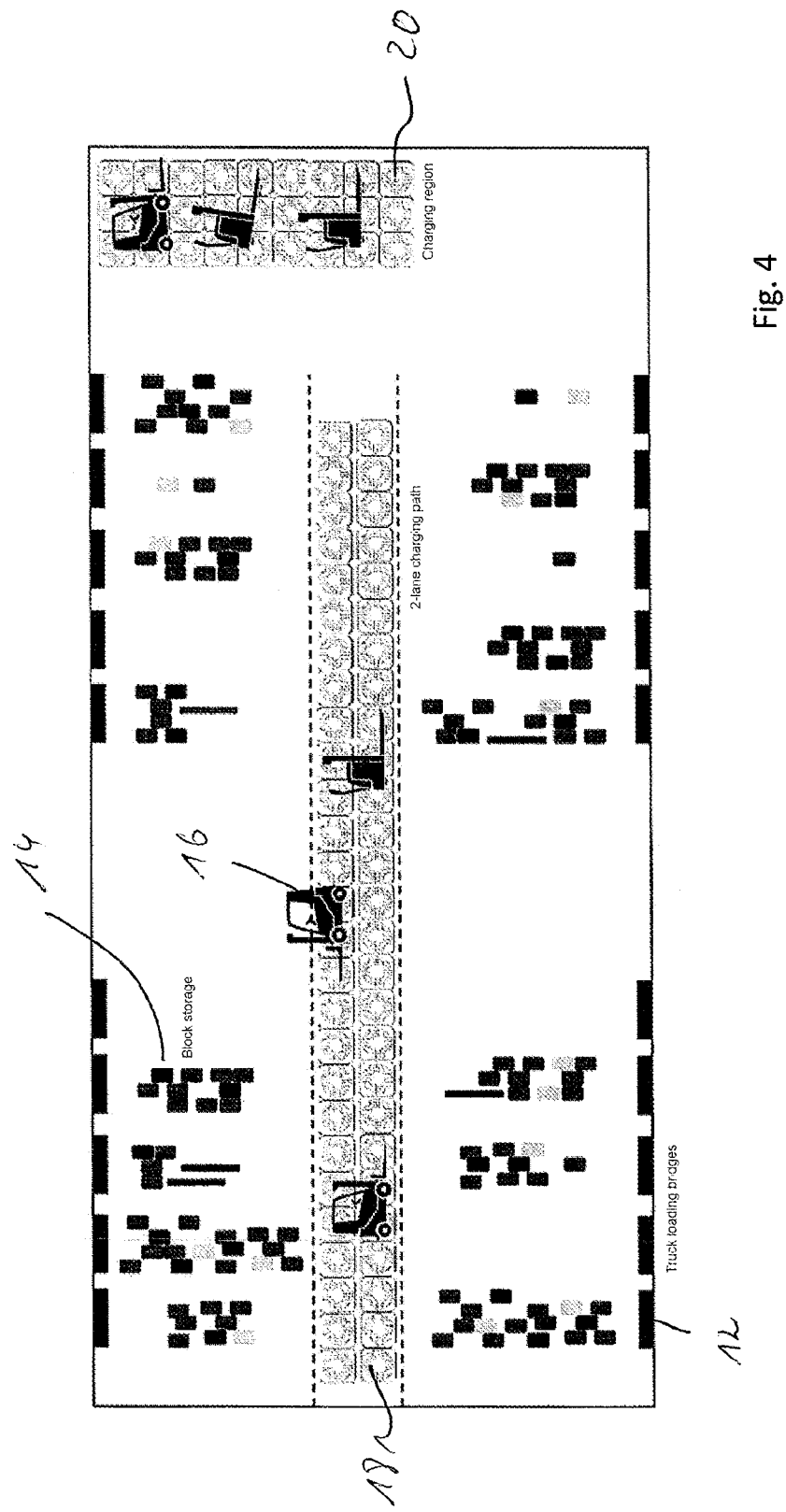
FIG. 4 is depicts an inductive charging system having two charging regions and block storage.

FIG. 4 shows a second alternative embodiment of a warehouse region having truck loading bridges 12 and a block storage 14. In this illustration, industrial trucks 16 in a central aisle region 18 are equipped with inductive chargers. A second region 20 is also equipped with inductive chargers. Here, industrial trucks that are not in use are being charged.

The invention claimed is:

1. A method of arranging inductive chargers in a warehouse for charging a plurality of industrial trucks used in the warehouse, comprising the steps of:
   providing a plurality of inductive chargers;
   receiving operating information pertaining to at least one of the plurality of industrial trucks;
   determining an average charging time of at least one of the plurality of industrial trucks using the operating information, wherein the average charging time indicates a period of time for which the at least one of the plurality of industrial trucks used in the warehouse can be charged on average during ordinary use;
   receiving a target value for an average charging time of at least one of the plurality of industrial trucks;
   determining an average power consumption for the at least one of the plurality of industrial trucks used in the warehouse;
   determining a charging quota for the at least one of the plurality of industrial trucks in the warehouse using the target value for the average charging time and a given charging capacity of the plurality of inductive chargers;
   automatically outputting a spatial distribution of the plurality of inductive chargers in the warehouse based on the charging quota such that the at least one of the plurality of industrial trucks can be charged at least to the target value for the average charging time during the ordinary use in the warehouse; and
   fixing the plurality of inductive chargers around the warehouse according to the output distribution of inductive chargers.

2. The method of claim 1, further comprising the step of:
   positioning the plurality of inductive chargers in the warehouse such that the at least one of the plurality of industrial trucks can be inductively charged while being operated in the warehouse.

3. The method of claim 1, further comprising
   determining a number of the plurality of inductive chargers in the warehouse in accordance with a capacity to receive a power charge.

4. The method of claim 3, wherein the step of determining a target charge value includes the step of:
   determining a number of stationary chargers in the warehouse and modifying the target charge value based on energy supplied by the stationary chargers.

5. The method of claim 4, further comprising the step of:
   determining an output power charge associated with the stationary chargers such that the number of inductive chargers for delivering a power charge can be reduced while, concurrently, allowing for the target value to be achieved.

6. The method of claim 5, further comprising determining the number of stationary chargers according to one of the following criteria:
   considering an occupancy rate for the stationary chargers;
   considering a total number of industrial trucks employed in the warehouse; and
   considering the target value for the average charging power of the inductive chargers during operation.

7. The method of claim 1, further comprising the step of further dividing the warehouse into a plurality of functional regions of the warehouse based upon whether the at least one of the plurality of industrial trucks is predominantly stationary or moving; and
   which regions are classified as being one of a loading, transfer and connection region.

8. The method of claim 1, further comprising the step of:
   monitoring whether the target value of the power charge has been reached for at least one inductively chargeable industrial truck during use in the warehouse.

9. A system for inductively charging an industrial truck, comprising a plurality of inductive chargers arranged in designated regions of a warehouse according to claim 1,
   wherein the plurality of inductive chargers are configured to deliver a power charge equal to a target value indicative of an average charging time associated with an inductively chargeable industrial truck.

10. The system of claim 9, further comprising a first floor region in a warehouse through which the at least one of the plurality of industrial trucks traverses, the first floor region having imbedded therein plurality of inductive chargers, and a second floor region in the warehouse which is void of inductive chargers.

11. The system of claim 10, wherein the first floor region comprises first subregions which include imbedded inductive chargers and second subregions which are void of inductive chargers.

12. The system of claim 9, wherein, the at least one of the plurality of industrial trucks comprises:
   an inductively chargeable energy store configured to be recharged by an inductive charger installed in a region of a warehouse; and
   wherein a capacity of the inductively chargeable energy store enables the chargeable energy store to be inductively charged during use in the warehouse to a level equal to at least a predetermined target value within an average charging time of the industrial truck over a duration of a driving shift in the warehouse.

13. The industrial truck of claim 12, wherein the inductively chargeable energy store can be inductively charged while the industrial truck is in use by an operator in the warehouse.

14. The method of claim 1, wherein a density of inductive chargers in a region of the warehouse is based on an average stay of the at least one of the plurality of industrial trucks in the region during the ordinary use.

* * * * *